US011514167B2

(12) United States Patent
Chen

(10) Patent No.: US 11,514,167 B2
(45) Date of Patent: Nov. 29, 2022

(54) COMPUTER SYSTEM HAVING FIRMWARE VERIFICATION MECHANISM AND FIRMWARE VERIFICATION METHOD OF THE SAME

(71) Applicant: Realtek Semiconductor Corporation, Hsinchu (TW)

(72) Inventor: Yi-Jui Chen, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 21 days.

(21) Appl. No.: 17/169,850

(22) Filed: Feb. 8, 2021

(65) Prior Publication Data
US 2021/0248238 A1    Aug. 12, 2021

(30) Foreign Application Priority Data
Feb. 12, 2020 (TW) ................. 109104410

(51) Int. Cl.
*G06F 21/57* (2013.01)
*G06F 9/44* (2018.01)
*G06F 9/4401* (2018.01)

(52) U.S. Cl.
CPC .......... *G06F 21/572* (2013.01); *G06F 9/4401* (2013.01)

(58) Field of Classification Search
CPC ................. G06F 21/572; G06F 9/4401; G06F 2221/033; H04L 9/30
See application file for complete search history.

(56) References Cited

U.S. PATENT DOCUMENTS
8,656,146 B2    2/2014  Findeisen et al.

FOREIGN PATENT DOCUMENTS

| CN | 103560882 A | 2/2014 |
| CN | 103959302 A | 7/2014 |
| CN | 108229188 A | 6/2018 |
| CN | 109445705 A | 3/2019 |
| TW | 200943123 A | 10/2009 |
| WO | 2009108371 A1 | 9/2009 |

*Primary Examiner* — Stefan Stoynov
(74) *Attorney, Agent, or Firm* — Locke Lord LLP; Tim Tingkang Xia, Esq.

(57) ABSTRACT

A computer system having a firmware verification mechanism includes a plurality of non-transitory storage circuits and a processing circuit. Each of the non-transitory storage circuits stores at least one of a plurality of strings not generated by using a random number. The processing circuit is configured to perform steps for firmware verification. The firmware verification includes the following steps. A to-be verified block of the device firmware is loaded. A plurality of public key composition strings of the strings are retrieved from the non-transitory storage circuits to combine the public key composition strings into a public key. The to-be verified block is compared with the public key to determine whether the to-be verified block is generated based on a private key calculated from the public key. When the to-be verified block is generated by the private key, it continues to perform a chain of trust verification.

9 Claims, 2 Drawing Sheets

COMPUTER SYSTEM HAVING FIRMWARE VERIFICATION MECHANISM AND FIRMWARE VERIFICATION METHOD OF THE SAME

CROSS-REFERENCE TO RELATED APPLICATION

This application claims priority to Taiwan Application Serial Number 109104410, filed Feb. 12, 2020, which is herein incorporated by reference in its entirety.

BACKGROUND

Technical Field

The present disclosure relates to a firmware verification technique, and more particularly, to a computer system having a firmware verification mechanism and a firmware verification method of the same.

Description of Related Art

Secure boot is a boot process that performs verification on the device firmware that is to be executed for prevention of the computer system executing unauthorized or modified firmware.

The present secure boot mechanism must generate a public key by computation with respect to a private key that is generated by using a random number, and store the public key in a one-time programmable storage circuit in the computer system. During the secure boot verification process, the public key is used for firmware verification of the firmware encrypted by the private key. However, this method not only requires a large storage capacity, but also presents difficultly in the updating of the public key. Improvements can be made in regards to both the cost due to storage capacity and data security.

Therefore, how to design a new computer system having a firmware verification mechanism and a firmware verification method of the same to solve the aforementioned deficiencies is a problem waiting to be solved by those in the industry.

SUMMARY

The summary of the disclosure aims at providing a simplified summary of the present disclosure, so that the reader has a basic understanding of the present disclosure. This summary of the disclosure is not a complete overview of the disclosure, and it is not intended to point out important/critical elements of embodiments of the present disclosure or define the scope of the present disclosure.

An object of the present disclosure is to provide a computer system having a firmware verification mechanism and a firmware verification method of the same to improve the problems of the prior art.

In order to achieve the aforementioned object, one aspect of the present disclosure is to provide a computer system having a firmware verification mechanism that includes a plurality of non-transitory storage circuits and a processing circuit. Each of the non-transitory storage circuits is configured to store at least one of a plurality of strings not generated by using a random number. The processing circuit is configured to perform steps for firmware verification corresponding to a device firmware. The firmware verification includes the following steps. A to-be verified block of the device firmware is loaded. A plurality of public key composition strings of the strings are retrieved from the non-transitory storage circuits for combining the public key composition strings into a public key. The to-be verified block is compared with the public key to determine whether the to-be verified block is generated based on a private key which is calculated from the public key. When the to-be verified block is determined as being generated by the private key, it continues to perform a chain of trust verification.

Another aspect of the present disclosure is to provide a firmware verification method applied to a computer system having a firmware verification mechanism, and firmware verification method includes the following steps. A to-be verified block of a device firmware is loaded by a processing circuit. A plurality of public key composition strings of a plurality of strings are retrieved from a plurality of non-transitory storage circuits by the processing circuit for combining the public key composition strings into a public key, wherein the non-transitory storage circuits are configured to store at least one of the strings not generated by using a random number. The to-be verified block is compared with the public key by the processing circuit to determine whether the to-be verified block is generated based on a private key which is calculated from the public key. When the to-be verified block is determined as being generated by the private key, the processing circuit continues to perform a chain of trust verification. The computer system having the firmware verification mechanism of the present disclosure and the firmware verification method of the same can reduce the cost for the storage circuit to store the key and increase the flexibility in the key update to improve the security of the computer system.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
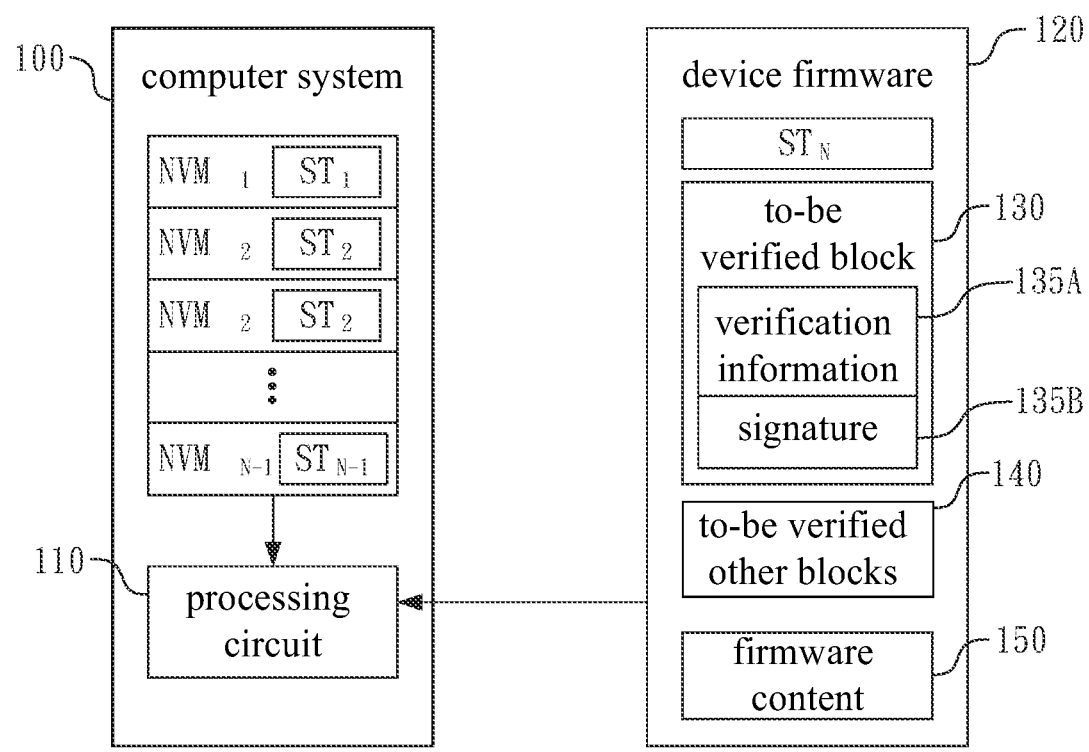
FIG. 1 is a block diagram of a computer system having a firmware verification mechanism according to an embodiment of the present disclosure.

Reference is made to FIG. 1. FIG. 1 is a block diagram of a computer system 100 having a firmware verification mechanism according to an embodiment of the present disclosure. The computer system 100 includes non-transitory storage circuits $NVM_1$-$NVM_{N-1}$ and a processing circuit 110.

Each of the non-transitory storage circuits $NVM_1$-$NVM_{N-1}$ is a non-transitory storage device. In more detail, the non-transitory storage circuits $NVM_1$-$NVM_{N-1}$ are storage devices whose internal storage data does not disappear when the power supply is stopped. For example, the non-transitory storage circuits $NVM_1$-$NVM_{N-1}$ may be storage devices including, for example, but not limited to, read-only memory (ROM), one-time programmable (OTP) storage devices, flash memory, or a combination thereof.

In an embodiment, the non-transitory storage circuits $NVM_1$-$NVM_{N-1}$ include at least one one-time programmable storage device to prevent the internal storage data from being modified.

Each of the non-transitory storage circuits $NVM_1$-$NVM_{N-1}$ is configured to store at least one of a plurality of strings which are not generated by using a random number. In FIG. 1, the non-transitory storage circuits $NVM_1$-$NVM_{N-1}$ are configured to store the strings $ST_1$-$ST_{N-1}$, respectively. It should be noted that in the present embodiment, each of the non-transitory storage circuits $NVM_1$-$NVM_{N-1}$ only stores a single string, but in other embodiments, each of the non-transitory storage circuits $NVM_1$-$NVM_{N-1}$ may store more than one string.

In an embodiment, the strings $ST_1$-$ST_{N-1}$ stored in the non-transitory storage circuits $NVM_1$-$NVM_{N-1}$ are not generated by using the random number, and have a specific meaning. For example, the strings $ST_1$-$ST_{N-1}$ may include device codes, physical address, email address, website address, company name, person name, or a combination thereof.

In an embodiment, the strings $ST_1$-$ST_{N-1}$ stored in the non-transitory storage circuits $NVM_1$-$NVM_{N-1}$ are stored under the protection of the stored protection function or the stored protection code so that their integrities are secured.

The processing circuit 110 is configured to perform a firmware verification corresponding to a device firmware 120. In FIG. 1, the device firmware 120 is shown as a block. However, in practice, the device firmware 120 is not a hardware component, but a firmware corresponding to a device (not shown) electrically coupled to the computer system 100.

In an embodiment, the device firmware 120 includes a string $ST_N$, a to-be verified block 130, to-be verified other blocks 140, and a firmware content 150.

The string $ST_N$, which is similar to the strings $ST_1$-$ST_{N-1}$ stored in the non-transitory storage circuits $NVM_1$-$NVM_{N-1}$, is not generated by using the random number and has the specific meaning. In addition, the string $ST_N$ can also be stored under the protection of the stored protection function or the stored protection code such that its integrity is secured.

The to-be-verified block 130 is generated by a private key and includes, for example, but not limited to, verification information 135A and a signature 135B. In an embodiment, the private key is calculated from the public key.

More specifically, in an embodiment, the strings $ST_1$-$ST_{N-1}$ stored in the non-transitory storage circuits $NVM_1$-$NVM_{N-1}$ and the string $ST_N$ in the device firmware 120 include a plurality of public key composition strings, such as, but not limited to, the strings $ST_1$-$ST_{N-1}$ and $ST_N$. These public key composition strings can be sorted and combined into the public key, and then the public key is calculated to generate a private key. Further, the private key is used to sign the content of the to-be verified block 130.

Therefore, when, for example, but not limited to, the computer system 100 boots up or the device corresponding to the device firmware 120 is turned on, the processing circuit 110 loads the to-be verified block 130 of the device firmware 120 for performing the verification.

In an embodiment, the processing circuit 110 retrieves the public key composition strings of the strings $ST_1$-$ST_N$ from the non-transitory storage circuits $NVM_1$-$NVM_{N-1}$ and the device firmware 120 to combine the public key composition strings into the public key.

In an embodiment, the processing circuit 110 retrieves and executes the read-only memory bootloader from, for example, but not limited to, the read-only memory in the computer system 100, to retrieve the public key composition strings and combine them.

Next, the processing circuit 110 compares the to-be verified block 130 with the public key to determine whether the to-be verified block 130 is generated by the private key which is calculated from the public key.

When the to-be verified block 130 is not generated based on the private key, it represents that the device corresponding to the device firmware 120 may be hacked. The processing circuit 110 would determine that the verification is not passed, and not continue to run the device.

When the to-be verified block 130 is generated by the private key, the processing circuit 110 determines that the verification is passed, and can continue to verify to-be verified other blocks 140.

In an embodiment, the verification information of the to-be verified other blocks 140 are interrelated to each other, and can be verified through a chain of trust verification process. When passing all the verifications, the processing circuit 110 can operate the device according to the firmware content 150.

In an embodiment, when the private key is stolen or hacked, or the to-be verified block 130 requires to be updated, another set of strings, which are not completely the same as or completely different from the previous public key composition strings, can be selected from the strings $ST_1$-$ST_N$ to be used as new public key composition strings, for example, but not limited to, the strings $ST_1$-$ST_{N-1}$ and $ST_N$, to be combined into a new public key. Since the string $ST_N$ is stored in the device firmware 120, it is easier to be modified and the composition of the public key composition strings can be further changed.

Next, a new private key can be calculated from the new public key, so as to generate a new to-be verified block 130 in the device firmware 120. When the device corresponding to the device firmware 120 intends to be verified, the new public key can be used for the verification.

In the aforementioned manner, the computer system 100 of the present disclosure having the firmware verification mechanism can generate the public key based on a plurality of meaningful and identity-based strings to calculate the private key, so as to sign the to-be verified block 130 of the device firmware 120. Further, the computer system 100 can use the public key to verify the to-be verified block 130 of the device firmware 120.

In this way, not only can the storage cost of each storage circuit be reduced by decentralized string storage, but also it is difficult for a hacker to access the string to obtain the public key or the private key. Moreover, since the public key is composed of meaningful strings, it is easier to identify it as the correct key rather than a tampered key. Furthermore, the updates of the public key and private key are easier since the partial strings can be stored in the firmware or a non-one-time programmable storage circuit, which can improve the flexibility of security maintenance.

Figure 2:
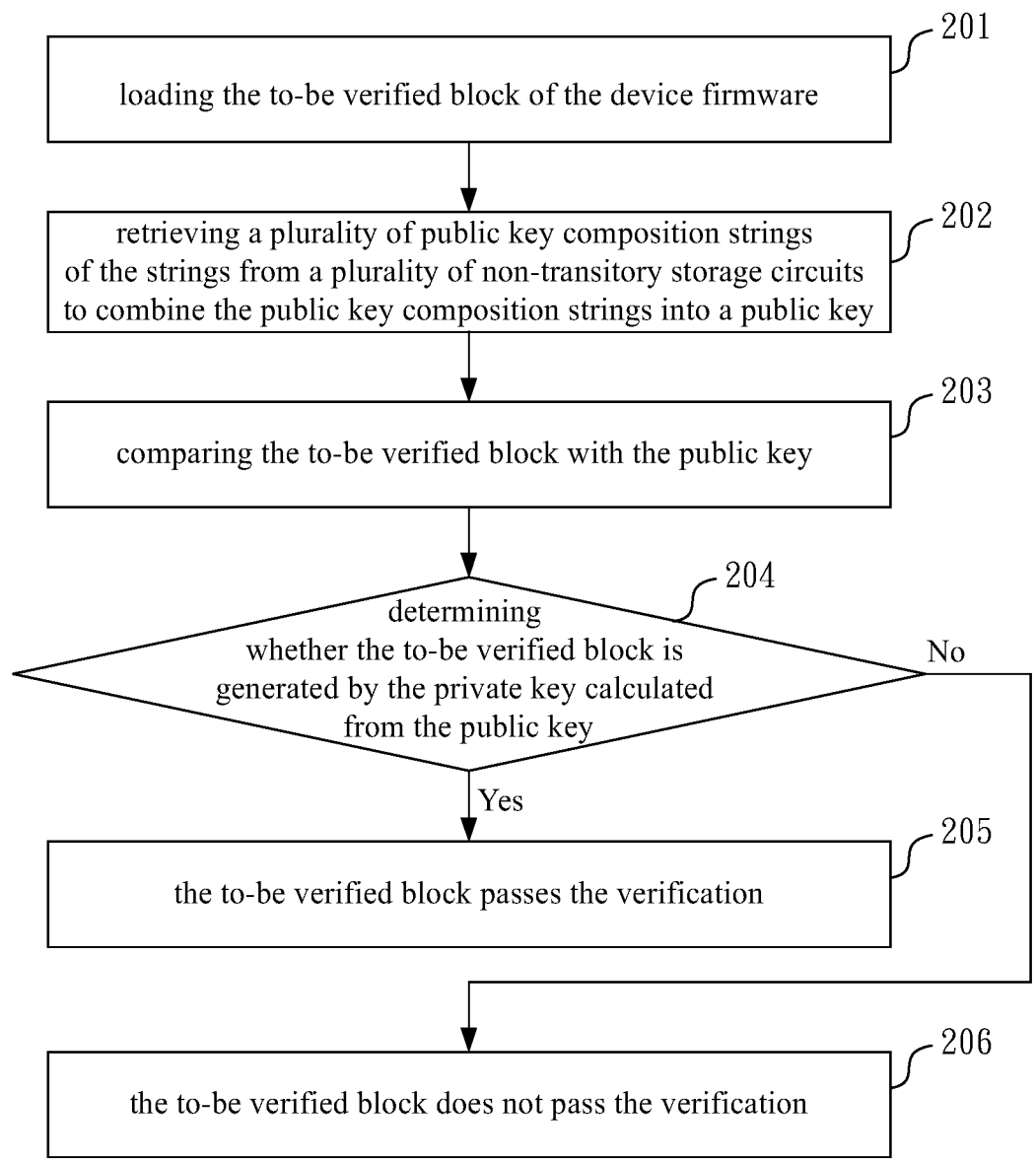
FIG. 2 is a flowchart of a firmware verification method according to an embodiment of the present disclosure.

FIG. 2 is a flowchart of a firmware verification method 200 according to an embodiment of the disclosure.

The firmware verification method 200 can be applied to the computer system 100 shown in FIG. 1. The firmware verification method 200 includes the following steps (it should be understood that the steps mentioned in the present embodiment, except for those whose sequences are specifically described, can be adjusted according to actual needs, and can even be executed simultaneously or partially simultaneously).

In operation 201, the to-be verified block 130 of the device firmware 120 is loaded by the processing circuit 110.

In operation 202, a plurality of public key composition strings of the strings are retrieved by the processing circuit 110 from a plurality of non-transitory storage circuits to combine the public key composition strings into a public key, in which the non-transitory storage circuits are configured to store at least one of the strings not generated by a random number.

In operation 203, the to-be verified block 130 is compared with the public key by the processing circuit 110.

In operation 204, the determination is made as to whether the to-be verified block 130 is generated based on the private key which is calculated from the public key.

In operation 205, when the to-be verified block 130 is generated by the private key, the processing circuit 110 determines that the to-be verified block 130 passes the verification.

In operation 206, when the to-be verified block 130 is not generated by the private key, the processing circuit 110 determines that the to-be verified block 130 does not pass the verification.

In an embodiment, after the to-be verified block 130 passes the verification, the processing circuit 110 may continue to perform the chain of trust verification on to-be verified other blocks in the device firmware 120.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. Therefore, the spirit and scope of the appended claims should not be limited to the description of the embodiments contained herein.

What is claimed is:

1. A computer system having a firmware verification mechanism, comprising:
    a plurality of non-transitory storage circuits, each of the non-transitory storage circuits being configured to store at least one of a plurality of strings not generated by using a random number; and
    a processing circuit configured to perform retrieving a plurality of public key composition strings from the plurality of strings stored in the non-transitory storage circuits for combining the public key composition strings to form a public key and to calculate the public key to form a first private key, wherein the processing circuit further performs steps for firmware verification corresponding to a device firmware, the steps comprising:
        loading a to-be verified block of the device firmware, wherein the to-be verified block is generated by a second private key;
        determining whether the second private key which generates the to-be verified block matches the first private key which is calculated from the public key; and
        determining that the to-be verified block passes the verification when the second private key which generates the to-be verified block matches the first private key.

2. The computer system of claim 1, wherein the non-transitory storage circuits comprise at least one one-time programmable storage device.

3. The computer system of claim 1, wherein the strings are stored in the device firmware and the non-transitory storage circuits via a protection function or a protection code.

4. The computer system of claim 1, wherein the to-be verified block comprises a verification information and a signature.

5. The computer system of claim 1, wherein the public key composition strings are retrieved and combined by a read-only memory bootloader.

6. The computer system of claim 1, wherein the firmware verification steps further comprise:
    selecting a plurality of new public key composition strings which are not completely the same as or completely different from the public key composition strings from the strings, so as to combine the new public key composition strings into a new public key;
    obtaining a new private key calculated from the new public key; and
    updating the to-be verified block of the device firmware according to the new private key.

7. A firmware verification method applied to a computer system having a firmware verification mechanism, comprising:
    retrieving a plurality of public key composition strings of a plurality of strings from a plurality of non-transitory storage circuits by the processing circuit for combining the public key composition strings to form a public key and to calculate the public key to form a first private key, wherein the non-transitory storage circuits are configured to store at least one of the strings not generated by using a random number;
    loading a to-be verified block of the device firmware, wherein the to-be verified block is generated by a second private key;
    determining whether the second private key which generates the to-be verified block matches the first private key which is calculated from the public key by the processing circuit; and
    determining that the to-be verified block passes the verification by the processing circuit when the second private key which generates the to-be verified block matches the first private key.

8. The firmware verification method of claim 7, wherein the device firmware comprises at least one of the strings, and the firmware verification method further comprises:
    retrieving the public key composition strings from the device firmware and the non-transitory storage circuits, so as to combine the public key composition strings into the public key.

9. The firmware verification method of claim 7, wherein the firmware verification method further comprises:
    selecting a plurality of new public key composition strings which are not completely the same as the public key composition strings from the strings, so as to combine the new public key composition strings into a new public key;
    obtaining a new private key calculated from the new public key; and
    updating the to-be verified block of the device firmware according to the new private key.

* * * * *